United States Patent [19]

Webber et al.

[11] Patent Number: 4,801,092

[45] Date of Patent: Jan. 31, 1989

[54] INJECTOR ASSEMBLY FOR A FLUID FUELED ENGINE

[75] Inventors: William T. Webber, Agoura; Robert M. Saxelby, Santa Susana, both of Calif.

[73] Assignee: Rockwell International Corporation, El Segundo, Calif.

[21] Appl. No.: 93,068

[22] Filed: Aug. 31, 1987

Related U.S. Application Data

[63] Continuation of Ser. No. 832,200, Feb. 24, 1986, abandoned.

[51] Int. Cl.⁴ .................................................. B05B 7/06
[52] U.S. Cl. ................................... 239/418; 239/424.5
[58] Field of Search ................... 239/424, 424.5, 433, 239/422, 429, 418

[56] References Cited

U.S. PATENT DOCUMENTS

| | | | |
|---|---|---|---|
| 1,324,866 | 12/1919 | Wilcox | 239/543 X |
| 1,494,020 | 5/1924 | Riehm | 239/543 X |
| 2,531,174 | 11/1950 | Tomlin | 239/418 X |
| 2,655,988 | 10/1953 | Marra | 239/418 X |
| 3,050,942 | 8/1962 | Dooley et al. | 60/258 |
| 3,093,314 | 6/1963 | Meyer | 239/433 X |
| 3,603,092 | 9/1971 | Paine et al. | 60/258 |
| 3,605,408 | 9/1971 | McGough | 60/39.74 |
| 3,615,054 | 10/1971 | Botz | 239/553.3 |
| 3,625,435 | 12/1971 | Mitchell | 239/543 |
| 3,662,960 | 5/1972 | Mitchell et al. | 239/400 |
| 4,315,490 | 2/1982 | Webber et al. | 123/275 |
| 4,326,377 | 4/1982 | Jaqua | 60/247 |
| 4,380,978 | 4/1983 | Maynard, Jr. et al. | 123/275 |
| 4,535,518 | 8/1985 | Jaqua | 29/157 |

FOREIGN PATENT DOCUMENTS 2147830 5/1985 United Kingdom ............... 239/418

*Primary Examiner*—Andres Kashnikow
*Assistant Examiner*—Mary Beth O. Jones
*Attorney, Agent, or Firm*—H. Fredrick Hamann; Harry B. Field; Lawrence N. Ginsberg

[57] ABSTRACT

An injector assembly 10 for injecting propellants into a fluid fueled rocket engine. Injection assembly 10 comprises a plate member 12 with an opening 16 therethrough. Injector element 14 is sealed within opening 16. Oxidizer flows through central bore 18 and through orifices 26 into combustion chamber 27. Fuel flows from passageway 34 into an annular manifold 38 formed at an interface between flanged portion 32 and plate member 12. Fuel is then injected through orifices 42 into combustion chamber 27 where it impinges with the oxidizer at predetermined points in the combustion chamber 27.

9 Claims, 2 Drawing Sheets

INJECTOR ASSEMBLY FOR A FLUID FUELED ENGINE

This is a continuation of co-pending application Ser. No. 832,200 filed on Feb. 24, 1986 now abandoned.

BACKGROUND OF THE INVENTION

The present invention relates to liquid fueled rocket engines, and more specifically, to injectors for liquid fueled rocket engines.

In the operation of rocket engines which employ liquid propellants especially liquid fuel and oxidizer materials, the propellants are injected into a combustion chamber through the face of an injector. The orifices through which the propellants pass are quite small in diameter, often under ten one-thousandths of an inch. In addition, the orifices are often formed in pairs with the individual orifices being angled so that the injected liquid streams meet at a point, called the impingement point, in the combustion chamber.

Forming the injector face with such small orifices and with all orifices having the correct orientations presents difficult fabrication problems and is expensive to accomplish. In many cases the injector body must be assembled from a number of subassemblies, and when this is the case it is important that the joints do not offer leakage paths through which an explosive mixture of fuel and oxidizer could inadvertently be formed. Since an injector with a misdrilled or damaged injection orifice is often not acceptable, it is desirable that the orifices be drilled in smaller subassemblies which are subsequently joined to form the entire injector. In this way a single damaged orifice will only require that one subassembly be discarded, and not the entire injector. To perform as intended, pairs of streams which are intended to impinge upon each other must have their centerlines located with an accuracy of a few thousandths of an inch. It is very difficult to machine, assemble and weld or braze subassemblies so that the holes in one subassembly will accurately impinge with the streams from the corresponding holes in a different subassembly. Hence, it is desirable that all pairs of holes which are intended to impinge should be drilled in the same subassembly. When it is desired to have a fuel stream impinge upon an oxidizer stream, it is especially difficult to simultaneously fulfill all of the above requirements.

One of the more common methods which has been used to fabricate injectors is to cast an injector blank with the manifolds cast in place, and then to drill the injection orifices through the injector face to intersect the manifold passages. However, with this approach, if a bad hole is drilled the entire injector is often rendered useless.

Another common method of fabrication is to machine circumferential flow passages into the back side of the injector blank, with the injection orifices drilled through the injector face to intersect the circumferential passages. After the drilling is complete, the circumferential passages are sealed off by welding or brazing rings into place. Again, with this approach, one poorly drilled hole may render the entire injector useless.

Yet another common method of construction is to machine manifolds into the injector face in the form of circumferential slots. These slots are later sealed off with rings which have previously been drilled with the injection orifices, and which are welded or brazed in place. However, with this approach corresponding pairs of holes are not drilled in the same subassembly and a slight displacement of the rings causes poor atomization and resultant poor performance.

When a rocket engine is to be used to repetitively fire very short duration burns (i.e. in pulse-mode operation), then the volumes of the flow passages between the valves and the injector face (i.e. the dribble volumes) are very important. Propellant is left in these passages at the conclusion of each pulse and is largely wasted by evaporation into a vacuum environment. Minimization of the volumes of these passages is imperative for efficient pulse-mode operation; however, to date no injector has been designed which fulfills the above-mentioned requirements while minimizing the dribble volume.

OBJECTS OF THE INVENTION

Accordingly, it is an object of the invention to provide a fuel injector assembly in which the fuel and oxidizer passages are separated by virgin metal so that joints in the assembly do not offer leakage paths through which an explosive mixture of fuel and oxidizer could inadvertently be formed.

It is another object to drill the injection orifices in small subassemblies instead of in the injector body, so that a bad hole will not render the entire injector useless.

Another object is to maintain corresponding pairs of holes which form impinging pairs of streams, in the same subassembly.

Still another object is to increase the pulse-mode efficiency of rocket engines by decreasing the dribble volume.

Other objects, advantages and novel features of the present invention will become apparent from the following detailed description of the invention when considered in conjunction with the accompanying drawing.

SUMMARY OF THE INVENTION

The present invention provides an injector assembly for a fluid fueled rocket engine. In its broadest aspects, the injector assembly comprises a plate member with an opening therethrough and an injector element which is sealed within the opening. The plate member includes a fluid passageway having a first end in fluid communication with a source of propellant and a second end in fluid communication with the opening. The injector element includes a first propellant injection passageway with an upstream end in fluid communication with a source of another propellant and at least one downstream end in fluid communication with the combustion chamber. The injector element also includes a second plurality of propellant injection passageways each having an upstream end in fluid communication with the fluid passageway in the plate member and a downstream end in fluid communication with the combustion chamber. The outlet of the injection passageways are drilled at appropriate angles so that the resulting propellant streams impinge upon each other at predetermined points in the combustion chamber.

In the preferred embodiment, the plate member is counterbored at the downstream face. The injector element is substantially cylindrical and includes an outwardly extending flanged portion at its downstream end. The flanged portion is contained within the counterbore and has a groove along its periphery so that an annular manifold is formed at the interface of the flanged portion and the plate member. This manifold connects the fluid passageway in the plate member to the second plurality of propellant injection passageways.

BRIEF DESCRIPTION OF THE DRAWINGS

The same elements or parts throughout the Figures of the drawings are designated by the same reference characters, while equivalent elements bear a prime designation.

DETAILED DESCRIPTION OF THE INVENTION

Figure 1:
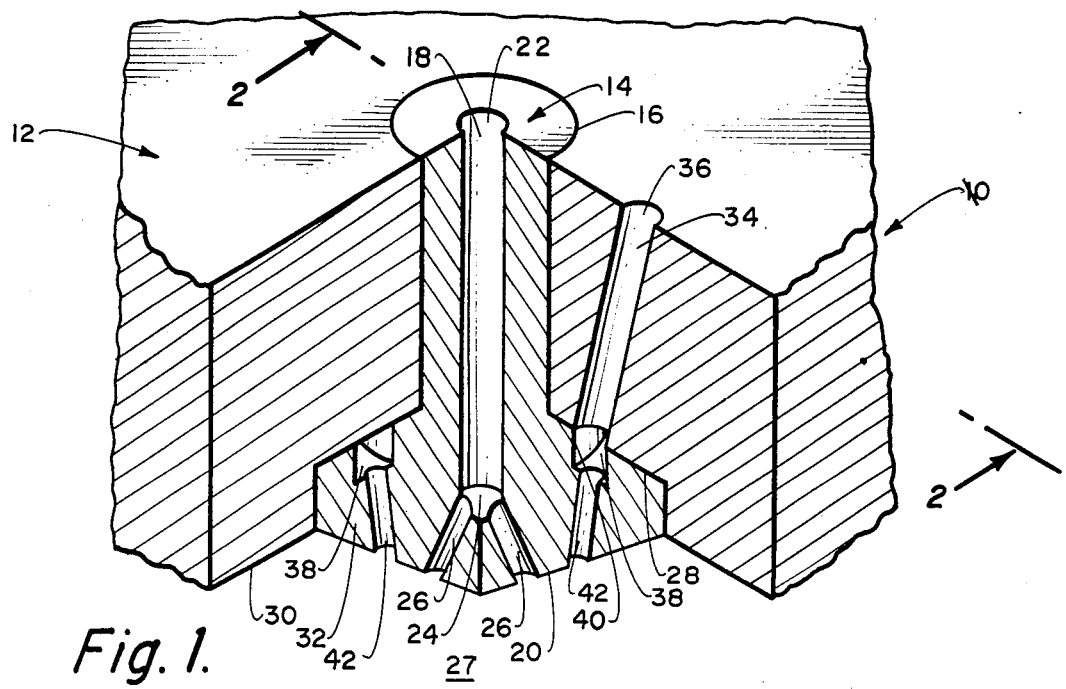
FIG. 1 is a perspective view, partially cut away, of a first embodiment of the present invention utilizing a single injector element.
Figure 2:
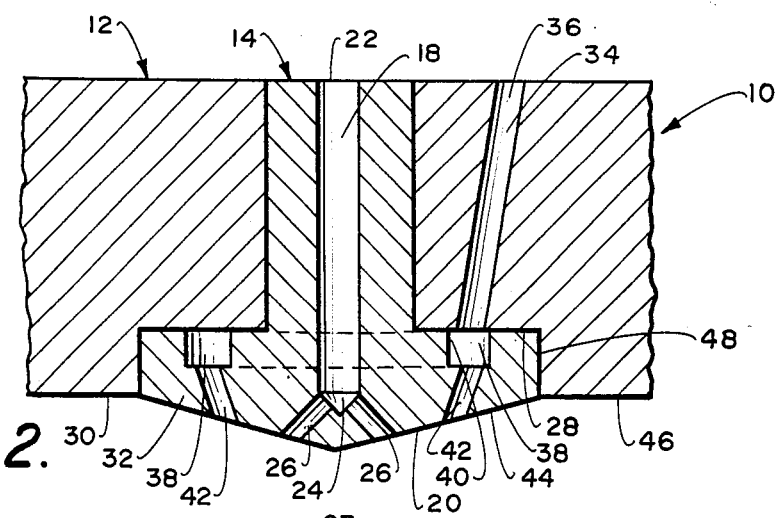
FIG. 2 is a side elevation view of FIG. 1 taken in cross-section.

Referring to FIGS. 1 and 2, an embodiment of the fuel injector of the present invention is designated generally as 10. The fuel injector 10 comprises a plate member 12 and an injector element 14. The injector element 14 is sealed, preferably electron beam welded, within an opening 16 extending through the plate member 12. The plate member 12 is preferably cylindrical; however, the shape is not critical. The embodiment shown in FIG. 1 utilizes a single injector element 14 and is useful for small engines, i.e. 0–500 lbs. of thrust.

The injector element 14 has a central bore 18 extending to near the downstream end 20 of the injector element 14. The central bore 18 serves as an injection passageway for a fluid propellant. The inlet 22 to the central bore 18 is connected, by a valve or manifolding means (not shown), to a source of fluid propellant, most likely an oxidizer.

The downstream end 24 of the central bore 18 is connected to a plurality of narrow orifices 26 further serving as propellant injection passageways for fluid propellant. During operation of the injector 10 fluid propellant flows through the central bore 18 through the orifices 26 and outwardly from the injector at a specific defined angle into the combustion chamber 27. The angle of impingement is typically between 20° and 90°, typically closer to 60°. The orifice diameters are typically between 0.004 and 0.200 inches.

The plate member 12 has a counterbore 28 in its downstream face 30 to contain a flanged portion 32 of the injector element 14. The plate member 12 also has a fluid passageway 34 having an inlet 36 connected to a second source of propellant, most likely fuel propellant. Propellant from the second source flows through the fluid passageway 34 to an annular manifold 38 at the interface between the plate member 12 and the injector element 14. The annular manifold 38 is formed by a circular groove 40 in the flanged portion 32. The propellant then flows through a second plurality of injection passageways (i.e. orifices 42) located in flanged portion 32. It flows outwardly at specific defined angles and impinges with the propellant flow from the first source at predetermined points within the combustion chamber 27. The downstream end 20 of the injector element 14 has a conical shape for ease in drilling the orifices 26,42.

With this plug in injector element approach, the injector element 14 is so inexpensive compared to the plate member 12 that several injector elements 14 can be drilled and test flowed and only the best sample installed, without incurring excessive costs.

The novel topology of this injector contains all injector orifices in the same small piece of metal while still allowing access for deburring of the upstream entries of all the orifices, and nevertheless allows separation of the fuel and oxidizer fluid passageways with virgin metal instead of by gasketed, brazed or welded joints. Furthermore, the complex details are confined to a small, easily sacrificed injector element 14 which can be easily machined and handled.

In addition to these advantages, the injector of the present invention permits a minimum manifold volume ("dribble volume") which is very important for increasing pulse-mode engine performance and for decreasing undesirable plume contaminant production. The low dribble volumes in the present injector result from the shortness and directness of the flow passages. The typical prior art injector consists of a number of annular manifolds, ducts interconnecting these annular manifolds and ducts feeding these manifolds from valve ports. The present injector contains only one annular manifold 38, which is the lowest possible number for a practical multi-hole injector. If the ducts from the valve ports are minimized in length and in cross-sectional area, and the single annular manifold is minimized in cross-sectional area and diameter, then the minimum dribble volume is obtained which is physically possible.

Figure 3:
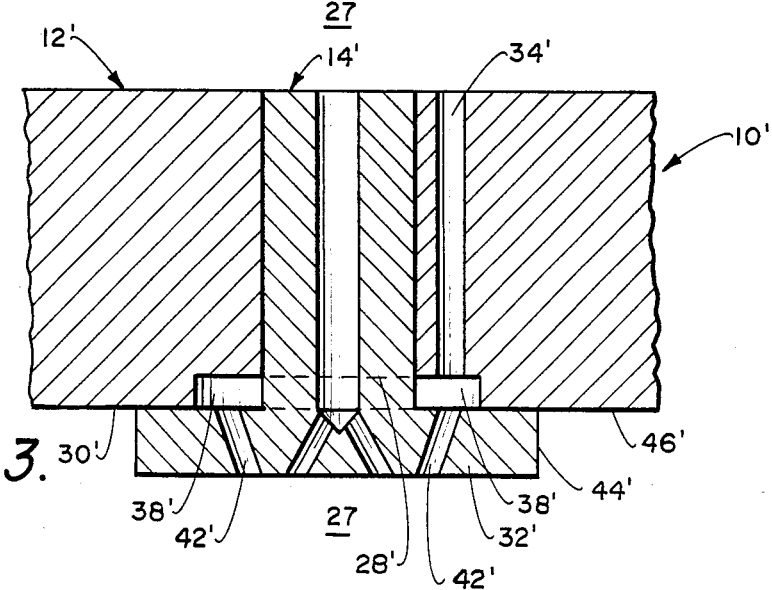
FIG. 3 is a cross-sectional view of a second embodiment of the invention which also utilizes a single injector element with an extended flanged portion.

Referring now to FIG. 3, a second embodiment of the invention is shown generally designated as 10'. In this embodiment the counterbore 28' in the downstream face 30' of the plate member 12' is not wide enough to allow emplacement of the flange portion 32' of the injector element 14'. The counterbore 28' forms an annular manifold 38' at the interface between the plate member 12' and the injector element 14' which provides means for fluid flow from passageway 34' to orifices 42'.

The embodiment shown in FIG. 3 is easy to machine because the flanged portion 32' is not inset within the plate member 12' and the flange portion 32' doesn't require a groove. However, the injector element 14' cannot be electron beam welded to the plate member 12' because surfaces 44', 46' are at 90°. Fusion welding or brazing at the juncture of surfaces 44' and 46' is required. However, in the FIG. 1 embodiment, the electron beam welding process may be utilized because the weld pool forms predominantly in the interface 48 near surfaces 44 and 46.

Figure 4:
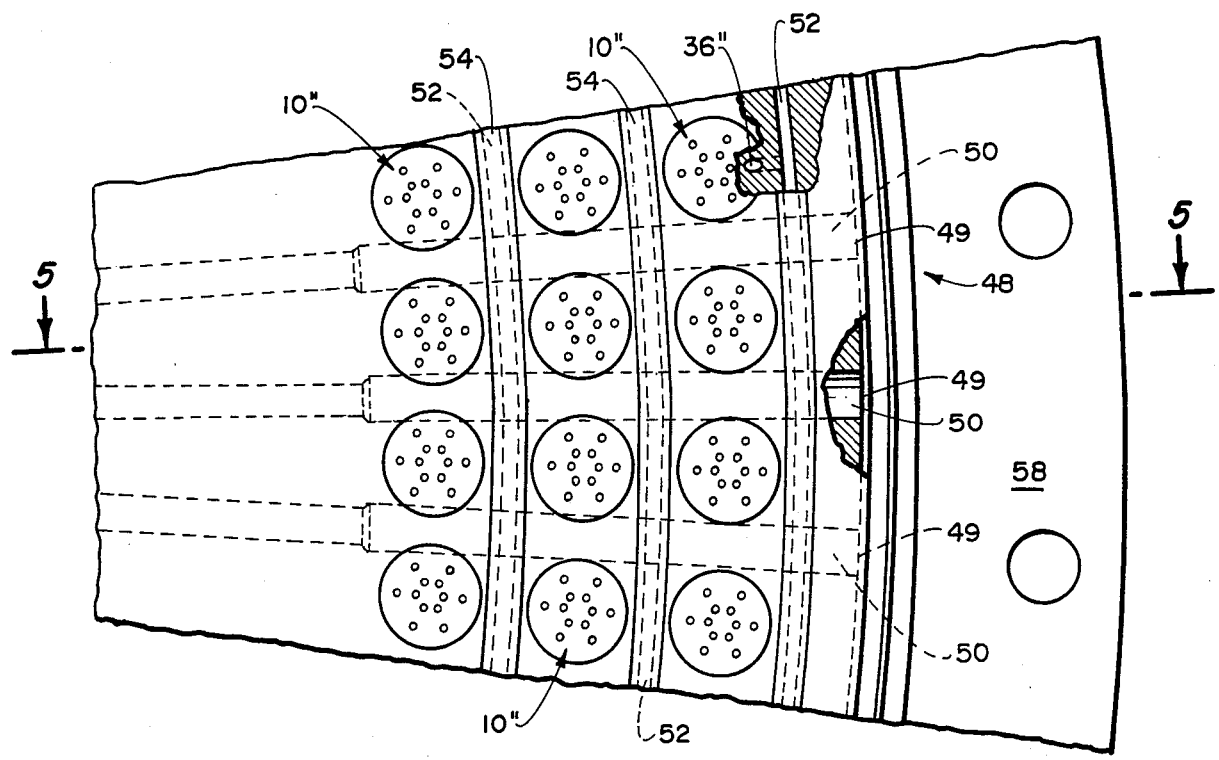
FIG. 4 is a back end view of a third embodiment of the invention which utilizes multiple injector assemblies.
Figure 5:
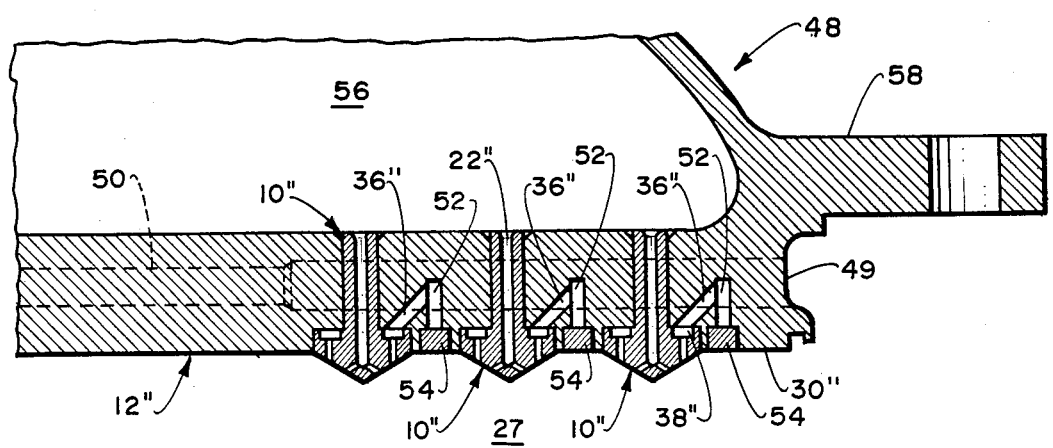
FIG. 5 is a side elevation view of FIG. 4 taken in cross-section.

Turning now to FIG. 4, a partial end view of injector 48 containing multiple injector assemblies 10' is shown. Multiple injector schemes are used in large engines, i.e. from 500 to over a million pounds of thrust. Injector 48, as embodied in FIG. 4, comprises a plurality of rows of circular injector assemblies 10' extending radially from the center (not shown) of the injector 48. A source of fluid propellant, most likely fuel, flows from inlets 49 thorugh a plurality of drilled radial passages 50 to circumferential passages 52 which form a manifold providing fuel flow into the individual injector assembly 10'. As shown in FIG. 5, the circumferential passages 52 are formed by machined grooves in the downstream face 30' of plate member 12'. Circumferential rings 54 prevent propellant from flowing directly to the combustion chamber 27. The propellant is, instead, directed through passageways 36' toward annular manifold 38'. A second propellant, most likely an oxidizer, is introduced from chamber 56 into inlets 22' of the individual injector assemblies 10'.

The circumferential edge of injector 48 includes a flange 58 which connects the injector 48 to the combustion chamber 27. Apart from the above-mentioned features, the individual injector assemblies 10' are identical to the injector assembly 10 described with reference to FIGS. 1 and 2.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An injector assembly for injecting first and second liquid propellants into a combustion chamber of a fluid fueled rocket engine, comprising:

a substantially solid, one-piece flat plate member having an upstream face in fluid communication with a source of said first propellant and a downstream face adjacent a combustion chamber.

said plate member having an opening extending therethrough from the upstream face to said downstream face, said opening being enlarged adjacent said downstream face, said plate member further including at least one narrow, straight fluid passageway having a substantially constant cross-sectional flow area for minimizing the volume of the propellants contained therein, said fluid passageway having a first end in fluid communication with a source of said second propellant and a second end in fluid communication with said opening; and a substantially solid injector element located in said opening in said plate member having an outer periphery in sealing engagement therewith, said injector element including a first propellant injection passageway having an upstream end in fluid communication with the source of said first propellant and at least one downstream end in fluid communication with said combustion chamber, said injector element further including a plurality of second propellant injection passageways having diameters in a range between 0.004 and 0.200 inches, each having an upstream end in fluid communication with the second end of said fluid passageway in said plate member and a downstream end in fluid communication with said combustion chamber;

said first and second propellant injection passageways being angularly disposed to provide for impingement of said propellants upon one another at predetermined points in said combustion chamber.

2. The injector assembly of claim 1 wherein:

the upstream end of said first propellant passageway includes a central bore extending through most of the length of the injector element and branching into a plurality of narrow orifices which extend to the downstream end of said first propellant passageway.

3. The injector assembly of claim 1 wherein:

said plate member is counterbored at the downstream face; and said injector element is substantially cylindrical and includes an outwardly extending flanged portion at the downstream end thereof said flanged portion being contained within said counterbore, said flanged portion having a face with a groove therein; wherein an annular manifold is formed at the interface of said face and said plate member, said manifold including:

an inlet in fluid communication with the second end of the fluid passageway in the plate member, and a plurality of outlets in fluid communication with the upstream ends of said plurality of second propellant injection passageways in said said injector element.

4. The injector assembly of claim 3 wherein:

the fluid passageway for second propellant extends partially through said plate member the first end of said fluid passageway connecting to a second manifold within said plate member which is in fluid communication with said second propellant.

5. The injector assembly of claim 3 wherein:

the upstream end of said first propellant passageway includes a central bore extending through most of the length of the injector element and branching into a first plurality of narrow orifices which extend to the downstream end of said first propellant passageway.

6. The injector assembly of claim 5 wherein:

said plurality of second propellant injection passageways includes a second plurality of narrow orifices equidistantly disposed about a central axis of said injector element.

7. The injector assembly of claim 6 wherein:

said second plurality of narrow orifices are equidistantly disposed about the central axis of said injector at a distance from the central axis which is less than the distance that the second plurality of orifices are disposed about the central axis, there being a one-to-one correspondence between each of said first and second plurality of orifices.

8. The injector assembly of claim 1 wherein:

said plate member is counterbored at the downstream face;

said injector element is substantially cylindrical and includes an outwardly extending flanged portion at the downstream end thereof, said flanged portion being wider than said counterbore and being positioned downstream of the downstream face of the plate member wherein;

said injector element and said plate member cooperatively form an annular manifold, said manifold including:

an inlet in fluid communication with the second end of the fluid passageway in the plate member, and a plurality of outlets in fluid communication with the upstream end of said plurality of second propellant injection passageways in said injector element.

9. In a fluid fueled rocket engine including an injector assembly for injecting first and second liquid propellants into a combustion chamber, the improvement to the injector assembly comprising:

a substantially solid one-piece plate member having an upstream face in fluid communication with a source of said first propellant and a downstream face adjacent a combustion chamber, said plate member having an open extending therethrough from the upstream face to said downstream face, said plate member further including a narrow fluid passageway having a first end in fluid communication with a source of said second propellant and a second end in fluid communication with said opening; and a substantially solid injector element located in said opening in said plate member having an outer periphery in sealing engagement therewith, said injector element including a first propellant injection passageway having an upstream end in fluid communication with the source of said first propellant and at least one downstream end in fluid communication with said combustion chamber, said injector element further including a plurality of second propellant injection passageways having diameters in a range between 0.004 and 0.200 inches, each having an upstream end in fluid communication with the second end of said fluid passageway in said plate member and a downstream end in fluid communication with said combustion chamber;

said first and second propellant injection passageways being angularly disposed to provide for impingement of said propellants upon one another at predetermined points in said combustion chamber.

* * * * *